United States Patent Office 2,918,493
Patented Dec. 22, 1959

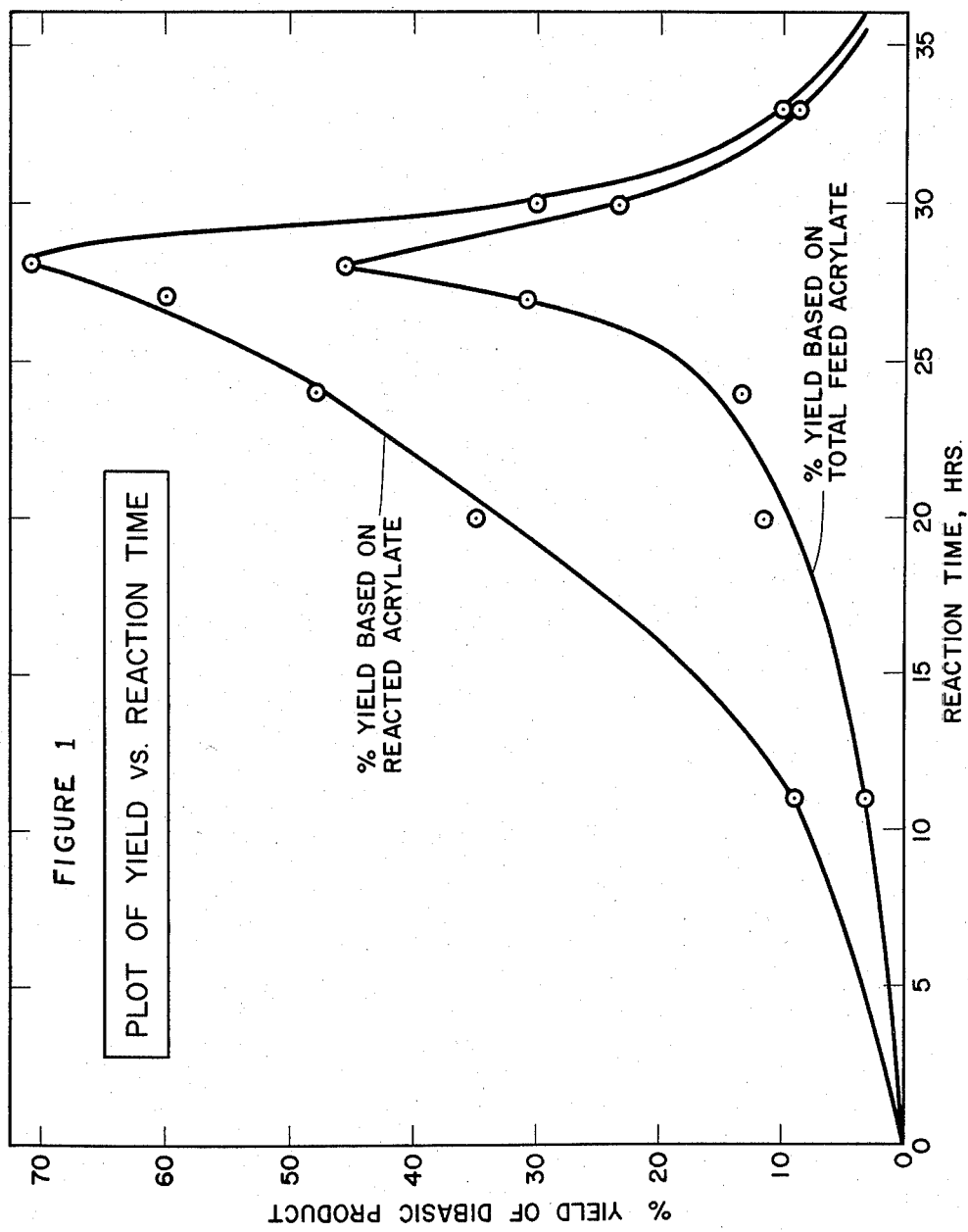

2,918,493

SYNTHESIS OF DIBASIC COMPOUNDS FROM AN OLEFIN AND ACRYLIC COMPOUND OR THE LIKE

Jerome Panzer, Rahway, N.J., and Alfred T. Blomquist, Ithaca, N.Y., assignors to Esso Research and Engineering Company, a corporation of Delaware Application July 18, 1957, Serial No. 672,752

4 Claims. (Cl. 260—485)

This invention relates to a novel method for the preparation of certain unsaturated dibasic compounds. More particularly, this invention relates to the synthesis of unsaturated compounds by a one-step thermal condensation of an olefin having a terminal double bond with an acrylic or alkyl-acrylic compound or the like. Furthermore, this invention relates to the hydrogenation of these dibasic compounds to form the corresponding saturated compounds.

It is known that aliphatic dicarboxylic acids or esters having a nonconjugated ethylenic linkage in certain desirable positions in the hydrocarbon chain between the two carboxyl or carboxylate gioups are advantageous compounds in many ways. Albisetti and Fisher in U.S. Patent No. 2,584,527 describe the preparation of carboxylic acids having a chain of seven carbon atoms and a single nonconjugated ethylenic linkage attached to the fourth carbon atom of that chain. This prior method comprises reacting an acrylic acid or ester with a 5-alkenoic acid or ester. The 5-alkenoic acid compounds necessitated synthesis by a prior, separate reaction of an olefin with an acrylic acid or ester.

There are several expected difficulties with respect to the above-mentioned reactions which have precluded the preparation of the desirable dicarboxylic acids and esters directly from the olefins in a one-step reaction with the acrylic acid compounds. Primarily these difficulties lie in the formation of undesirable side products, especially polymers. Olefins and especially acrylic compounds are highly susceptible to polymerization, and when maintained at high temperatures for long periods of time, such as required by the present invention, such polymerization would be expected to be unavoidable. Therefore the prior art has nowhere suggested the possibility of reacting olefins with acrylic compounds to form the corresponding diesters. On the other hand, since olefins are readily available in refinery streams and could be recycled continuously in such a one-stage operation, it can be easily understood that the above-mentioned one-stage synthesis would be considerably more satisfactory than the heretofore known two-stage operation.

Therefore, an object of the present invention is to prepare highly advantageous unsaturated dicarboxylic acids, esters, and the like, in a one-step operation from an olefinic raw material. A further object is to obtain the desired unsaturated dibasic compounds in high yields while minimizing polymer formation. Another object is to prepare a compound which can readily be hydrogenated into saturated dibasic compounds valuable as lubricants, plastics, chemical intermediates, and the like. Other objects as well as the true nature and operation of the invention will become more clearly apparent from the subsequent description and specific examples.

The attached diagram, Figure 1, shows a plot of the data obtained in the specific embodiment of the invention described in detail hereinafter.

It has now been found that certain olefins will react with certain acrylic or alkyl-acrylic compounds, or the like, to form, in one stage, certain unsaturated dicarboxylic acids and esters or the like, which have a contiguous chain of 7 carbon atoms between the two functional groups and a single nonconjugated ethylenic linkage attached to the fourth carbon atom in said chain.

The olefins suitable for the present invention must have a terminal double bond, a methyl group adjacent to the innermost of the doubly bonded carbon atoms, and may have a total of 3 to 20 carbon atoms. A few specific suitable olefins are propylene, isobutylene, and other tertiary olefins such as the proper isomers of hexene, nonene, dodecene, tetradecene, octadecene, eicosene, etc. The $C_3$ to $C_{10}$ olefins are preferred, and propylene and isobutylene are especially preferred.

The suitable acrylic compounds, are those having the formula

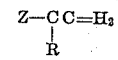

wherein R represents hydrogen or an alkyl group having 1 to 10, preferably 1 to 3, carbon atoms, and Z represents an electron-withdrawing group, i.e., a group which by inductive or resonance effects tends to increase the electron density within its vicinity by reducing the electron density in the area of neighboring groups. Examples of "electron-withdrawing" groups are —COOX, —CN, —NO$_2$, —COX, —CONX$_2$, —CS$_2$X, —SCOX, and the like, where X represents hydrogen or an alkyl group having 1 to 10, preferably 1 to 4, carbon atoms. The compounds containing the —COOX group are preferred. Therefore, some suitable examples are acrylic acid, alpha methyl acrylic acid, isobutyl acrylic acid, decyl acrylic acid, methyl arcylate, methyl methacrylate, propyl acrylate, propyl amylacrylate, ethyl decyl-acrylate, acrylonitrile, acrylonitrate, acrolein, methacrolein, etc. Preferable acrylic compounds are acrylic acid, methyl acrylic acid, methyl acrylate, and methyl methacrylate.

The present invention lies essentially in the discovery that the above mechanism will take place in one reaction zone without necessitating the separation of the monobasic intermediate compound. Actually, the general reaction is a series of equilibrium reactions which may be illustrated as follows:

Equation B

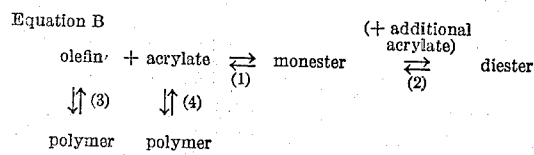

Once the monoester has been formed and removed from the reaction mixture, there is no serious difficulty in obtaining the diester in accordance with the teaching of U.S. Patent 2,584,527, since equilibrium Reaction 2 is a relatively fast reaction, thereby not allowing any substantial polymerization of the additional acrylate. On the other hand, if the monoester is not removed, the polymerization Reactions 3 and 4 would normally be expected to dominate esterification Reaction 1 after extended periods of time, since the polymer is a more stable composition than the monoester. In other words, in order to obtain high yields of the monoester, the skilled chemist would remove the monester from the reaction mixture as it is formed—otherwise the reactants would be expected to go almost entirely into polymer.

However, it has now been discovered that by maintaining optimum temperature and pressure conditions for a certain critical reaction period in the presence of a polymerization inhibitor, the dicarboxylic acid or ester can be formed in high yield without first separating and removing the monoester. In other words, a proper balance of critical conditions will minimize polymer formation and thereby maximize the yield of the desired dibasic product.

These operating conditions include a temperature between 180° and 300° C., preferably between 200° and 260° C.; a super-atmospheric pressure between 25 and 1,000 atmospheres, preferably between 75 and 250 atmospheres; a reaction time adapted to give maximum yield of dibasic product, preferably between 10 and 35 hours, more preferably 20 to 30 hours; a ratio of acrylic compound to olefin of 1/1 to 5/1, preferably about 3/2 to 3/1; and the presence of polymerization inhibitor in polymerization inhibiting amounts, preferably between 0.03 and 0.15 mole per mole of acrylic compound. The temperature, pressure, and feed ratio are all related to the reaction time; for instance, the higher the temperature, the lower the critical reaction time.

Necessarily maintained in the reaction zone is a polymerization inhibitor, preferably hydroquinone. Other inhibitors include other substituted phenols such as methoxy phenol and di-tert-butyl phenol; amines such as methyl amine and naphthylamines; phenolic amines such as p-aminophenol; and other antioxidants such as copper resinate and the like.

The reaction time is perhaps the most significant single factor involved in the present invention. One would expect a high degree of polymerization over such an extended period. Nevertheless, this has not been found to be the case until the reaction time has surpassed the critical range. Then the polymerization rapidly is realized and the yield of the dibasic product drops sharply. Not intending to limit the invention to any theory, the following explanation is presented as a possible reason for the new and surprising findings. With reference to Equation B, it is believed that the equilibrium Reactions 1 and 2 initially proceed to the right much more rapidly than Reactions 3 and 4 in the presence of the polymerization inhibitor; therefore the diester forms in large quantities before the polymer. However, it is further believed that equilibrium Reactions 1 and 2 are much more reversible than are 3 and 4; therefore, after the newly discovered critical reaction time has been exceeded, Reactions 3 and 4 catch up with 1 and 2, and since the polymer is more stable (less reversible reaction) than the diester, formation of the polymer then dominates the total conversion of reactants.

The present invention is adaptable to both batch and continuous operation. Following the reaction, the residue is cooled and rapidly distilled to yield a small amount of unreacted reactants and the monobasic intermediate compound, along with a substantial proportion, i.e., at least 10%, preferably at least 25%, based on the total feed acrylic compound (at least 30%, preferably at least 50%, based on reacted acrylic compound), of the desired dibasic product. The unreacted portion and the monobasic compound may be recycled to the reaction zone. The dibasic higher boiling product is diluted with a suitable solvent, e.g., diethyl ether, and washed with an alkaline solution, e.g., NaOH, and a salt solution, e.g., NaCl, to remove any acid impurities such as hydroquinone, or with an acid solution to remove an alkaline impurity such as an amine polymerization inhibitor. The product is then dried and redistilled to give a pure final product.

This product may then be hydrogenated over a suitable hydrogenation catalyst, e.g., platinum, at a temperature between 0 to 300° C. and a pressure between 1 and 350 atmospheres to yield the corresponding pure, fully saturated, dibasic compound. Other suitable hydrogenation catalysts are nickel, palladium on carbon, and the like. The saturated product is especially useful as a lubricant for aircraft turbines. Other uses include use as a base oil in greases, use as a chemical intermediate in making lubricant additives, and the like.

For purposes of illustration, a preferred embodiment will now be set forth in detail. Unless otherwise designated, all percentages and ratios are given throughout on a weight basis.

EXAMPLE I

A series of runs were performed in the following manner. Four moles (224 gms.) of isobutylene, six moles (516 gms.) of methyl acrylate stabilized with about 0.001 weight percent p-methoxy phenol and 40 gms. of hydroquinone were charged to a 3-liter vented steel liner cooled by Dry Ice. The liner was inserted in a stainless steel bomb and heated therein to a temperature of 240° C. The calculated pressure in the liner was about 150 atmospheres. After agitation at 240° C. at variable reaction times, the bomb was cooled to about 20° C. and the unreacted isobutylene was vented off. The reaction mixture was then quickly distilled in a Claisen flask at about atmospheric pressure to give unreacted methyl acrylate boiling at about 80° C., methyl 5-methyl-5-hexenoate boiling at 107–109° C., a higher boiling fraction contaminated with hydroquinone, and residue removed as bottoms. The high boiling material was diluted with an equal volume of diethyl ether and washed thoroughly first with dilute sodium hydroxide and then with a saturated sodium chloride solution until neutral. After drying over magnesium sulfate and evaporation of the ether, the residue was distilled in a 30-inch Podbielniak column operated at about 2.4 mm. Hg. A pure dimethyl delta-methyleneazelate fraction, boiling point 124–125° C. (2.4 mm. Hg), $n_D^{25}$ 1.4510, $d_4^{25}$ 1.0203, was recovered in addition to a higher boiling impurity which was found to comprise largely a triester arising from the condensation of three molecules of methyl acrylate with one molecule of isobutylene. The yield of the dimethyl azelate, based on the total methyl acrylate not recovered, i.e., total reacted methyl acrylate, is shown in the table below and in the attached diagram (Figure 1) in relation to the reaction time.

Table

| A | B | C | D | E |
|---|---|---|---|---|
| Run No. | Reaction Time, Hrs. | Percent Yield Dimethyl Azelate, Based on Reacted Acrylate | Percent Feed Acrylate Recovered Unreacted | Percent Yield Dimethyl Azelate Based on Total Feed Acrylate |
| 1 | 11 | 9 | 62 | 3.4 |
| 2 | 20 | 35 | 66 | 11.9 |
| 3 | 24 | 48 | 73 | 13.0 |
| 4 | 27 | 60 | 48.5 | 30.9 |
| 5 | 28 | 71 | 36 | 45.5 |
| 6 | 30 | 30 | 21 | 23.7 |
| 7 | 33 | 10 | 14 | 8.6 |

It is seen from the table and the diagram that the yield of the diester, whether based on the total feed acrylate or just the reacted acrylate, increases very slowly at first, then very rapidly after about 20 hours, and then drops sharply when the reaction time reaches about 28 hours. The data in column D show also that the total amount of reacted methyl acrylate increases greately after about 24 hours which is evidence that polymer formation is increasing, until it finally overtakes diester production after 28 hours and practically dominates such production after about 32–33 hours. It is emphasized at this point that the critical time range observed from the above set of data is variable to the extent that it is dependent upon other factors such as temperature and pressure. The critical time range of 20 to 30 hours seen above might change to 10 to 20 hours at higher temperatures, or to 25 to 35 hours at lower temperatures. What is important therefore is that a proper balance of operating conditions must be maintained. An appropriate description might be that the reaction takes place at a temperature between 180 and 300° C. and at superatmospheric pressure for a reaction period adapted to give at least 10%, preferably 25%, yield, based on the total feed acrylic compound, of the diester.

EXAMPLE II

A sample of 0.3517 grams of the pure diester of Example I was contacted with about 37.3 cc. of hydrogen over Adams' catalyst (platinum pentoxide) in an absorption zone operated at 745 mm. Hg pressure and 19° C. Dimethyl deltamethylazelate was recovered in 89% yield. This saturated diester, boiling point 113–115° C. (1.5 mm. Hg), $n_D^{25}$ 1.4370, is an especially good lubricant.

Having described the general nature, typical embodiments, and uses of the present invention, the true scope thereof is now particularly set forth in the appended claims.

What is claimed is:

1. A one-step process for preparing an unsaturated bifunctional compound having a contiguous chain of 7 carbon atoms between the two functional groups and a single nonconjugated ethylenic linkage attached to the fourth carbon atom of said chain which comprises heating in a reaction zone, in the presence of a polymerization inhibiting amount of a polymerization inhibitor, at a temperature between 180° and 300° C. and at superatmospheric pressure between 25 and 1,000 atmospheres a $C_3$ to $C_{10}$ olefin, having a terminal double bond and a methyl group adjacent to the innermost doubly bonded carbon, with a second reactant having the formula $$CH_2 = CR - COOX$$

wherein R represents a group selected from the group consisting of hydrogen and alkyl groups having 1 to 10 carbon atoms and X is a group selected from the group consisting of hydrogen and alkyl groups having 1–4 carbon atoms; and withdrawing the bifunctional product after an extended reaction period adapted to give at least 10% yield, based on the total feed of said second reactant, of said product.

2. A one-step process for the preparation of an unsaturated compound selected from the group consisting of dicarboxylic acids and their $C_1$–$C_4$ alkyl esters wherein there is a contiguous chain of 7 carbon atoms between the carboxy groups and a single nonconjugated ethylenic linkage attached to the fourth carbon in said chain, which comprises heating 1 mole of a $C_3$ to $C_4$ olefin having a terminal double bond and a methyl group adjacent to the innermost doubly bonded carbon atom, with 1 to 5 moles of a compound selected from the group consisting of acrylic acid, methyl acrylic acid, methyl acrylate, and methyl methacrylate in a reaction zone in the presence of a polymerization inhibiting amount of a polymerization inhibitor, at a temperature between 200° and 260° C., at a pressure between 75 and 225 atmosphers, for a period adjusted between 10 and 35 hours to give at least 25% yield, based on the total feed of acrylic compound, of the dicarboxylic product, and separating and recovering the dicarboxylic product.

3. The process of claim 2 wherein the olefin is isobutylene, the acrylic compound is methyl acrylate, and the corresponding product is dimethyl delta methyleneazelate.

4. A process which comprises heating methyl acrylate with isobutylene in about a 3/2 to 3/1 molar ratio in a reaction zone in the presence of 0.03 to 0.15 moles of hydroquinone per mole of acrylate at a temperature of about 220° to 240° C., a pressure of 75 to 225 atmospheres, for a period adjusted between 20 and 30 hours to give at least 25/ yield, based on the total feed acrylate, of the diester product, passing the resulting reaction mixture to a distillation zone, separating and recycling to the reaction zone the unconverted methyl acrylate and the monobasic methyl-5-hexenoate, and recovering overhead the higher boiling dimethyl delta-methyleneazelate containing fraction.

References Cited in the file of this patent

UNITED STATES PATENTS

| | | |
|---|---|---|
| 2,584,527 | Albisetti et al. | Feb. 5, 1952 |
| 2,671,814 | Mertzweiller | Mar. 9, 1954 |

OTHER REFERENCES

Alder et al.: Chem. Abs. 44, 2923–2924 (1950).